United States Patent [19]

Schewe et al.

[11] Patent Number: 4,843,507
[45] Date of Patent: Jun. 27, 1989

[54] MAGNETIC HEAD WITH LAMINATED STRUCTURE

[75] Inventors: Herbert Schewe, Herzogenaurach; Dietrich Stephani, Erlangen; Armin Lenhart, Neunkirchen, all of Fed. Rep. of Germany

[73] Assignee: Siemens Aktiengesellschaft, Berlin and Munich, Fed. Rep. of Germany

[21] Appl. No.: 126,771

[22] Filed: Nov. 30, 1987

[30] Foreign Application Priority Data

Dec. 3, 1986 [DE] Fed. Rep. of Germany ....... 3641196
Dec. 3, 1986 [DE] Fed. Rep. of Germany ....... 3641222

[51] Int. Cl.⁴ ............. G11B 5/187; G11B 5/31/5/127
[52] U.S. Cl. ................... 360/125; 360/119; 360/122; 360/126
[58] Field of Search ................ 360/126, 125, 122, 119

[56] References Cited

U.S. PATENT DOCUMENTS 4,287,544 9/1981 Lazzari ................................. 360/131
4,740,855 4/1988 Diepers et al. ...................... 360/126

FOREIGN PATENT DOCUMENTS 0185280 12/1985 European Pat. Off. .
2058436 4/1981 United Kingdom .

OTHER PUBLICATIONS

IEEE Transacations on Magnetics (a) vol. MAG-16, No. 1, Jan. 1980, pp. 71-76, (b) vol. MAG ∝ 17, No. 6, Nov. 1981, pp. 3120-3122, (c) vol. MAG-20, No. 5, Sep. 1984, pp. 657-662 and 675-680.

Primary Examiner—Robert S. Tupper
Attorney, Agent, or Firm—Kenyo & Kenyon

[57] ABSTRACT

A magnetic head having layered structure for a recording medium for vertical magnetization contains a conductor body on a non-magnetic substrate for conducting the magnetic flux with two magnet legs, the end pieces of which form a thin main pole and a comparatively thicker auxiliary pole. The two magnetic poles are separated by an insulating gap layer of at least 5 μm. This magnetic head and particularly its gap layer should be relatively simple to produce. Recesses are provided in the substrate to submerge at least the end piece of the auxiliary pole of one magnet leg and an adjoining part of this leg as well as at least part of the gap layer.

11 Claims, 5 Drawing Sheets

MAGNETIC HEAD WITH LAMINATED STRUCTURE

BACKGROUND OF THE INVENTION

1. Field of the Invention

The invention relates to a magnetic head with layered structure for magnetizing a recording medium perpendicularly in a manner that is often referred to as vertical magnetization. A magnetic head with a structure for producing such magnetization is disclosed in West Germany Pat. No. 2,924,013 or U.S. Pat. No. 4,287,544. The invention also relates to a method for the production of magnetic heads.

2. Description of Related Knowledge

The concept of perpendicular magnetization of a suitable recording media for data storage is generally known (cf. "IEEE Transactions on Magnetics", Vol. MAG-16, No. 1, Jan. 1980, pp. 71 to 76 or Vol. MAG-20, No. 5, Sept. 1984, pp. 657 to 662 and 675 to 680). Application of this concept, which is also called vertical magnetization, requires specific read/write magnetic heads and particular recording media. A head suitable for this application generally uses a conductor body made of a magnetizable material to conduct the magnetic flux and shaped to have two magnet legs in the shape of a horseshoe. One magnetic leg forms a main pole and generates a sufficiently strong perpendicular magnetic field to magnetically reverse the storage layer of the recording medium along a track. The other magnet leg returns the magnetic flux through a second pole which is termed an auxiliary pole.

In magnetic heads of this head type the auxiliary pole serves solely for guiding the magnetic return flux. This head type writes solely with the main pole and is therefore also called a single pole-piece head.

West German Pat. No. 2,924,013 describes a head of this type (cf. "IEEE Trans. Magn.", Vol. MAG-17, No. 6, Nov. 1981, pp. 3120 to 3122). Accordingly, the known magnetic head contains the auxiliary pole at its front end when viewed along the line of travel of the recording medium. The main pole is located on the back face. The two poles are arranged on a flat surface of a non-magnetic substrate with the normal on this surface being parallel to the direction of travel. The main pole consists essentially of a thin layer extending perpendicularly to the line of travel of the end piece of the corresponding magnet leg. In contrast, the auxiliary pole lies in front of the main pole in its line of travel. The auxiliary pole is formed from an end piece and is significantly thicker than that of the other magnet leg. This auxiliary pole is composed of several thin magnetic layers arranged perpendicularly to the line of travel. Each layer is separated by an insulating layer. Several steps must be taken to prevent co-reading of the auxiliary pole. Its flow-off edge covers a comparatively large area of the track. The distance formed between the two poles must be sufficiently great to ensure an extensive reduction in the magnetic flux density at the auxiliary pole. Therefore, an air gap between the two poles of at least 5 $\mu$m in width is generally provided.

Any remaining space of the air gap that faces the recording media of this known magnetic head that is not taken up by the conductor windings of a read/write wire-wound coil must be filled with, at least, an insulating gap layer. A suitable insulating layer should consist of a hard material so that notches and washouts can be prevented in the process of producing the head. It is known that accumulated dust can cause uneven sites to occur on the disk by causing the magnetic head to crash as it guides over the recording medium at an extremely close distance. It is known to be extremely difficult to cause a known magnetic head to create its own gap layer between the main pole and the auxiliary pole. Problems arise in creating a magnetic flux return in the back part of the magnetic head between the two magnet legs where the gap layer must be etched through. The known magnetic head has a relatively extended structure when seen in the line of travel. Moreover, smoothing is problematic so that the magnetic properties of the main pole can be impaired due to the relatively extended structure of the known magnetic head.

Great Britain Pat. No. 2,058,436 discloses a magnetic head that has a shape resembling a ring with one of two magnet legs located in a depression of a substrate. However, the end pieces of the magnet legs forming the magnetic poles are so closely adjacent to each other that the head cannot have a main and auxiliary pole and therefore cannot function as a single pole-piece head. This type head does, however, eliminate problems associated with developing a broad gap layer. Furthermore, in this known magnetic head the portion of the one magnet leg submerged in the substrate does not lie in the region of the magnetic pole but in a central expanded head region through which the conductor windings of the read/write wire-wound coils extend. A similar structure of a magnetic head with closely adjacent magnetic poles is disclosed in European Patent Application No. 185,289.

SUMMARY OF THE INVENTION

A magnetic conductor body conducts magnetic flux between end pieces formed from magnet legs which face the recording medium to form a thin main pole and a comparatively thicker auxiliary pole on one side of a non-magnetic substrate. The end pieces are aligned in the direction of travel of the head. The end pieces are separated by at least one insulating gap layer that has a separation between the magnetic poles of at least 5 $\mu$m. The head is provided with at least one read/write coil winding that has conductor windings extending through an intermediate space formed between the magnet legs.

The present invention improves on known magnetic heads in being relatively simple to produce and in causing fewer problems in developing the gap layer. The substrate has a recess to submerge at least the end piece of the magnet leg forming the auxiliary pole and an adjoining part of this leg as well as at least a portion of the gap layer.

The design of the magnetic head according to the present invention has the advantage that the auxiliary pole is submerged in the recess. A sufficiently thick gap layer is easily created after developing the appropriate magnet leg by filling the remaining space of the recess with the material of the gap layer. The construction of the magnetic head can then occur on a leveled surface by known means.

It is particularly advantageous that the magnetic head according to the invention be produced by first creating a depression in a planar flat side of a substrate so that at least one side face and the floor determine the shape of the magnet leg forming the auxiliary pole. A magnetic layer can be applied to the planar flat side. The magnetic layer has a thickness on the floor of the depression that corresponds to the thickness of the end piece of the associated magnet leg forming the auxiliary pole. The remaining space of the depression can be filled with the material of the gap layer. The conductor windings of the read/write wire-wound coil and the magnetic layer of the additional magnetic leg forming the main pole can then be applied. Finally, the completed structure can be cut open in a plane at a position determined by the under side of the magnetic head facing the recording medium.

DETAILED DESCRIPTION

Figure 1:
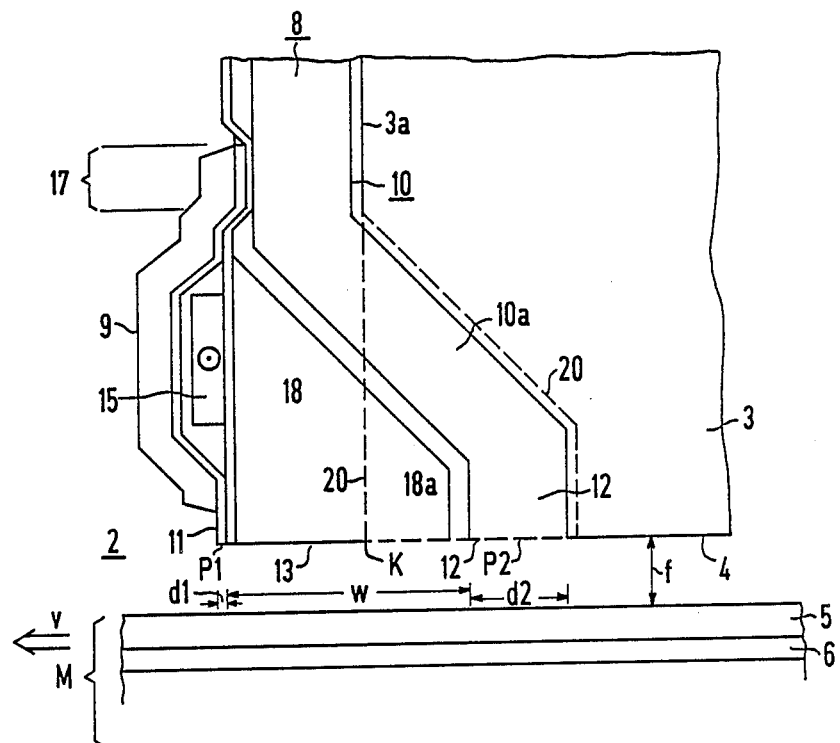
FIG. 1 shows a partial cross section of a magnetic head according to the present invention.

FIG. 1 shows a partial cross section magnetic head according to the present invention. The horseshoe shaped design of single pole-piece heads are known. Read and write functions can occur according to the principle of perpendicular or vertical magnetization as exemplified in the West German Patent mentioned above. The head, labeled generally as 2, is carried by a substrate that forms the front or back face of a conventional element referred to as flying body, not shown in detail in FIG. 1. This head is guided relative to a known recording medium M at a low flying altitude f of its underside 4 at a distance of, for example, 0.2 $\mu$m. The recording medium M moves below head 2. The relative line of travel of these parts is indicated by an arrow labeled v. The recording medium to be vertically magnetized contains a suitable storage layer 5 of, for example, CoCr or Ba-ferrite and is placed on a soft-magnetic base 6 comprising, for example, a NiFe alloy similar to that now sold under the AT&T trademark PERMALLOY.

Magnetic head 2 contains a magnetic conductor body 8 made from a suitable soft-magnetic material for conducting the magnetic flux. In this material light magnetization is always directed primarily perpendicular to the direction of the magnetic flux. The conductor body 8 consists of two magnet legs 9 and 10 which extend at least approximately perpendicularly to the surface of the recording medium. Their end pieces 11 and 12 face the recording medium to form magnetic poles P1 and P2, respectively. The thinner magnetic pole P1 forms a conventional main pole and the comparatively significantly thicker magnetic pole P2 forms a conventional auxiliary pole. Magnetic head 2 is intended to function as quasi single pole-piece head. It is advantageous to select a thickness d2 of the auxiliary pole P2 to be measured in the line of travel v. Thickness d2 is at least three times, and preferably at least five times, as large as the corresponding thickness d1 of the main pole P1. The surface of the auxiliary pole P2 facing the recording medium should preferably be at least one to two orders of magnitude greater than the corresponding surface of the main pole P1. Furthermore, thickness d2 should be greater than the permissible distance of flux changes required by the recording code being used. The reading of each track effects at least two flux changes of different polarity of auxiliary pole P2 so as to further reduce any possibility of co-reading at the auxiliary pole. These conditions can be fulfilled in general if the thicknesses d2 is between approximately 2 and 30 $\mu$m.

An air gap 13 is formed between the two poles. Air gap 13 has a relatively extended longitudinal width w of more than 5 $\mu$m in the direction of travel v. The windings of a read/write wire-wound coil 15 that serve the main pole P1, not shown in FIG. 1, extend through air gap 13. The two magnet legs 9 and 10 are joined in known manner in a connection region 17 on the side of the conductor body 8 facing away from the recording medium. The conductor body 8 has a horseshoe shape. The residual space remaining between the magnet legs 9 and 10 is filled with a hard insulating material, particularly in the region of the air gap 13. The corresponding layer 18 is generally called a gap layer.

As can be seen further in the cross section shown in FIG. 1, the magnetic head 2 is not, as is customary, sitting on a planar flat side 3a of substrate 3 which extends perpendicularly with respect to the underside 4 of head 2. Rather, according to the present invention, a recess 20 is provided in the region of edge K that is otherwise formed between these sides 3a and 4. The shape of the recess is determined by the shape of the magnet leg 10 forming the auxiliary pole P2. Recess 20 has a trapezoidal cross section as indicated in FIG. 1 by a dashed line. It is filled by the end piece 12 as well as a part 10a of the magnet leg adjoining it, and by a partial piece 18a of the gap layer 18 that is trapezoidal cross section.

Figure 2:
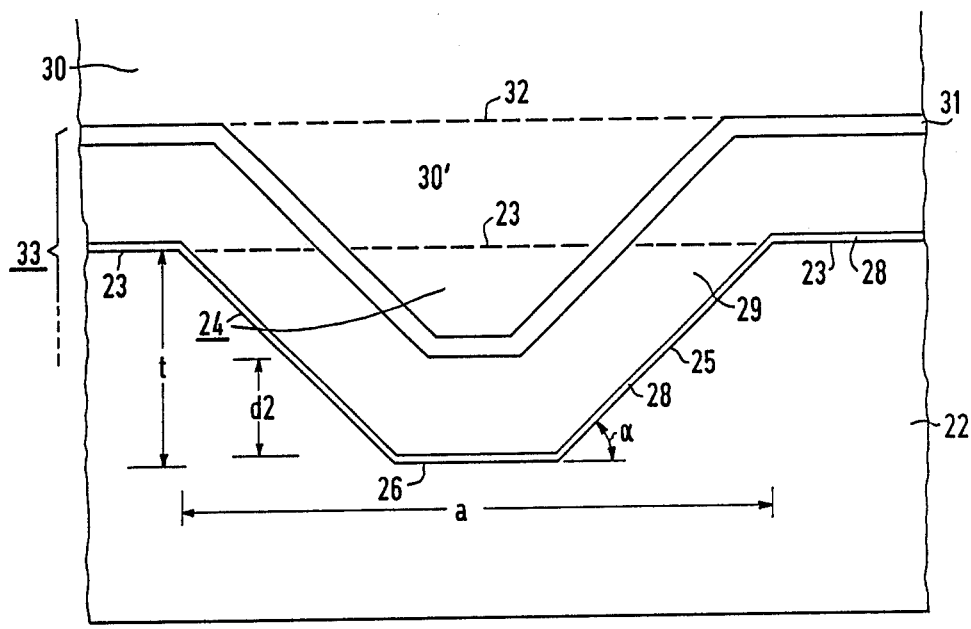
FIGS. 2 and 3 represent two processing steps used in the manufacture of the magnetic head shown in FIG. 1.

Magnetic head 2 is produced by using known thin layer and thin film techniques. Discrete layers are applied in a known manner by vacuum metallization or sputtering, or through galvanic or currentless deposition of the layer lying below. The starting material is an initially planar non-magnetic substrate or substrate body 22 such as a wafer of TiC—Al$_2$O$_3$ mixed ceramic material. FIG. 2 shows a longitudinal cross section in which a trench-shaped depression 4 is worked into a planar flat side 23 of substrate 22. This depression should have at least one oblique embankment 25 and a floor 26 parallel to the plane of the flat side 23. The position and extent of these areas is determined by the shape of the magnet leg forming the auxiliary pole to be produced. Here, the angle $\alpha$ of embankment 25 should be acute as measured against the plane of the flat side 23 and lie between approximately 30° and 70° and preferably between 35° and 50°. Dimension a of the depression 24 in the longitudinal direction of the magnet legs should preferentially be between 60 and 300 $\mu$m in the primary direction of the magnetic head. The depth t of the floor 26 with respect to the plane of the flat side 23, is between 7 and 200 $\mu$m. It is advantageous that depression 24 in substrate 22 in the region of the auxiliary pole, i.e. on the floor 26, is smoothed in a step rising and, for example chemically, or mechanically polished. Good magnetic properties can thus be achieved for the subsequently applied magnet leg and its magnetic layer. Alternatively, a smooth coating can be applied as a glaze.

A thin insulating layer 28 of a nitride, carbide or oxide, for example, an Al$_2$O$_3$-layer of 15 $\mu$m ($\pm$5 $\mu$m) thickness is deposited on a substrate 22 of an electrically conducting material such as, for example, TiC-Al$_2$O$_3$. Insulating layer 28 serves as base for receiving an adjoining, relatively thick layer 29 of a magnetic material such as PERMALLOY or amorphous CoZr. Magnetic layer 29 has a thickness d2 in the region of the floor 26 and can be laminated by preferentially non-conducting thin insulating layers of, for example, approximately 20 nm thick $SiO_2$. These insulating layers reduce eddy current losses that occur at higher frequencies. The thickness of the discrete lamina depends on the frequency range required.

Finally, a hard, electrically conducting material is applied on the magnetic layer 29 as a thin intermediate layer 31. The gap layer is then formed by coating the entire structure in known manner with a very thick, hard insulating layer 30. Insulating layer 30 consists of, for example, $Al_2O_3$ or a glass. Suitable vitreous layers can be produced, for example, through solder glass or sinter glass techniques. A sol-gel process that serves this purpose is also known, as are metalorganic starting materials that can be provided with subsequent calcination. The intermediate layer 31 can, for example, consist of TiN and can serve advantageously as a stop layer for subsequent lapping and polishing in which the insulating layer 30 is removed down to a plane 32 determined by the upper edge of the intermediate layer 31. The removal of material from the side of the insulating layer 30 can progress until the intermediate layer 31 is reached. The electric contact that occurs with the device carrying out the removal once this intermediate layer is exposed can be used as a signal to end the removal process. FIG. 2 designates the intermediate product as 33 and the remaining residue of the insulating layer 30 as 30'.

Figure 3:
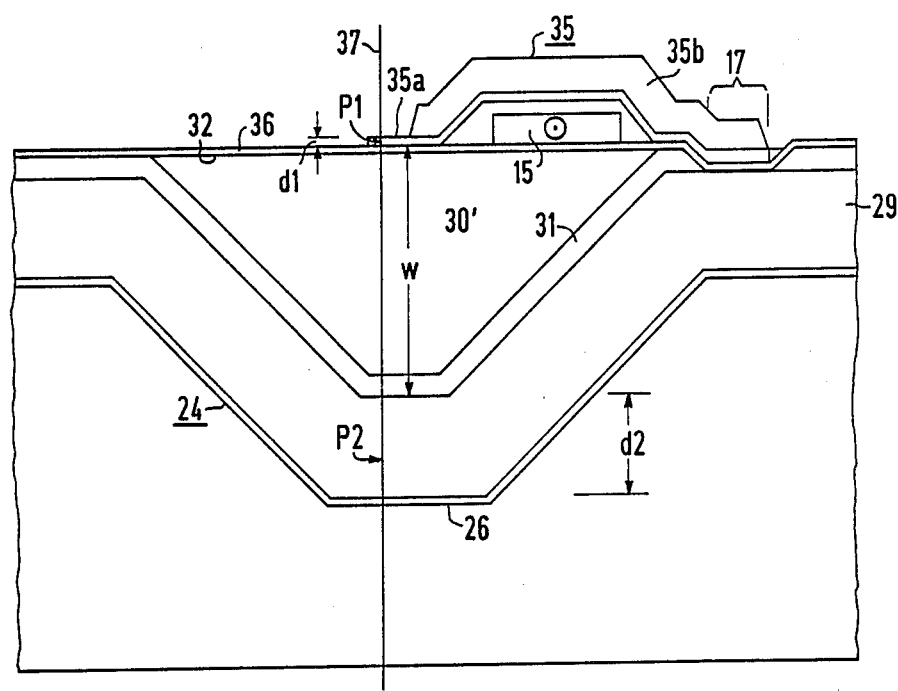

FIG. 3 shows intermediate product 33 forming the basis of the section used for further development of the magnetic head according to the invention. The intermediate layer 29 can be etched free given a very thick intermediate layers 31 of TiN in the region of the magnetic flux return in the connection region 17 between the magnetic layer 29 of the magnet leg forming the auxiliary pole P2 and a magnetic layer 35 of the magnet leg forming the main pole P1. The magnetic resistance between the magnetic layers forming the magnet legs can thus be reduced. Subsequently, a thin layer 36 comprising electrical insulation is applied to the substructure to form, for example, a 0.5 $\mu$m thick $SiO_2$ layer. Subsequently, the windings of the read/write wire-wound coil 15 and the magnetic layer 35 is structured. Magnetic layer 35 is advantageously composed of a thin layer 35a forming the main pole P1 and a thicker layer 35b ending outside the pole region. It is particularly advantageous that this thicker magnet layer 35b end just before the tip of the pole so that the pole tips can be driven to saturation during writing and read effectively. A lower track width of at most 14 $\mu$m avoids undesirable termination domains, if, at least magnetic layer 35a of the main pole is also laminated. For final finishing, the flying body the structure is cut along the plane indicated by line 37 and subsequently lapped. In this process the plane is placed so that, standing perpendicularly on the plane 32 of the intermediate product 33, it cuts floor 26 and forms the underside 4 of the magnetic head 2 of the flying body facing the recording medium. The lapping process, which otherwise is very complicated with thin film ring heads, can be carried out without difficulty due to the relatively large distance between the main pole and the auxiliary pole.

Figure 4:
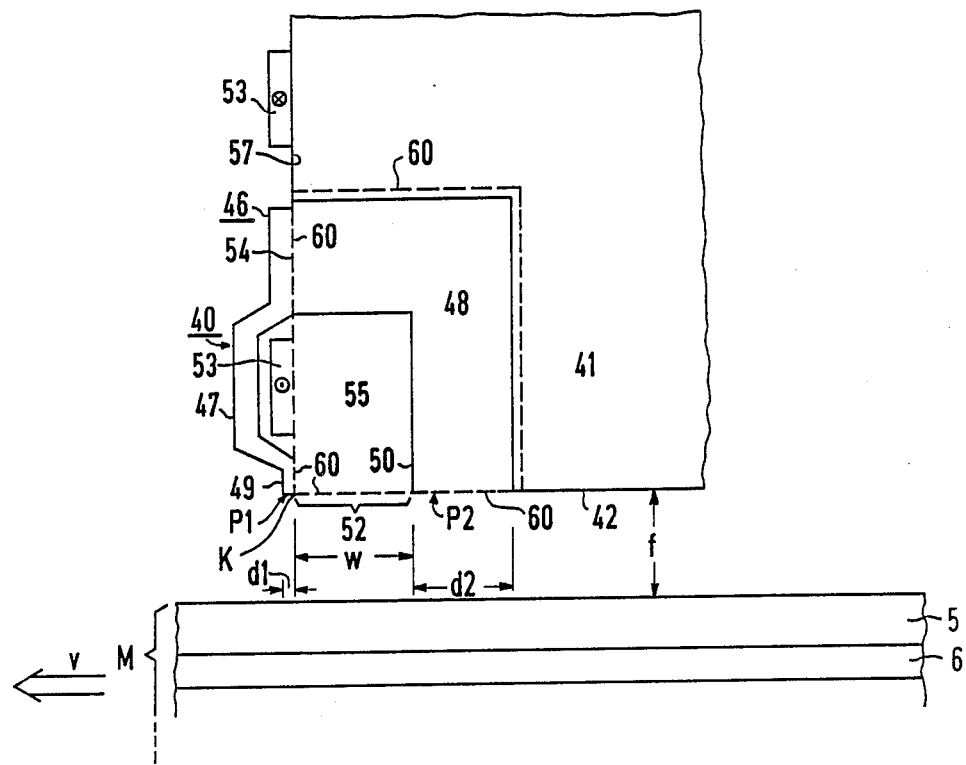
FIGS. 4 and 8 show a further modification of a magnetic head according to the present invention.

A further model of a magnetic head according to the invention is evident from the cross section shown in FIG. 4. The head labeled generally as 40 corresponds in function and largely in structure to the magnetic head shown in FIG. 1. The head is carried by a substrate 41. Its underside 2 is guided at a low altitude f relative to the recording medium M.

Magnetic head 40 contains a magnetic flux conductor body 46 which is made from a material having a predetermined orientation of the light magnetization. The conductor body 46 consists of two magnet legs 47 and 48 that are oriented in the region of their end pieces 49 and 50 to face the recording medium M and be at least approximately perpendicular to the surface of the recording medium. The conductor body thus forms magnetic poles P1 and P2, respectively. The thinner magnetic pole represents a conventional main pole and the comparatively significantly thicker magnetic pole P2 represents a conventional auxiliary pole. The magnetic head 40 thus functions as quasi single pole-piece head. It is preferred to select a thickness d2 for the auxiliary pole that is at least three times, and preferentially five times, as large as the corresponding thickness d1 of the main pole P1 as measured in the line of travel v. The surface of the auxiliary pole P2 that faces the recording medium should preferentially be at least one to two orders of magnitude greater than the corresponding surface of the main pole P1. Additionally, thickness d2 should be greater than the permissible flux change distance given by the recording code being used. Thicknesses for d2 of between approximately 2 and 30 $\mu$m are advantageous. An air gap 52 having a longitudinal width w of more than 5 $\mu$m is formed between the magnetic poles. The windings of a read/write wire-wound coil 53 for the main pole P1, not shown, extend through the air gap. The two magnet legs 47 and 48 are joined in a connecting region 54 on the side of the magnetic conductor body 46 that faces away from the recording medium M to obtain the horseshoe-shaped form of the magnetic conductor body 46. The residual space remaining between the magnet legs 47 and 48, especially in the region of the air gap 52, is filled with a gap layer 55 of a hard, insulating material.

As shown in cross section in FIG. 4, magnetic head 40 is inserted into a planar flat side 57 of the substrate 41 extending perpendicularly with respect to the underside 42 of the head 40. To achieve this result with the present invention, a recess is provided in the region of the edge K otherwise formed between these sides 57 and 42 and recess 60. The shape of the recess is determined by the shape of the magnet leg 48 forming the auxiliary pole P2. Recess 60 is indicated in FIG. 4 by a dashed line that has an approximately rectangular cross section. Magnet leg 48 and gap layer 55 are placed completely into the recess.

Figure 5:
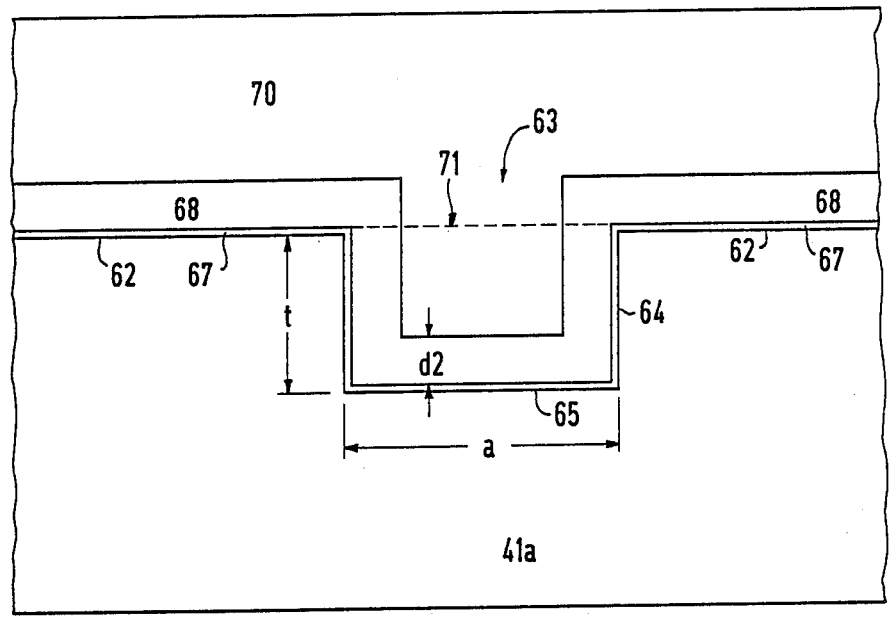
FIGS. 5, 6 and 7 illustrate three processing steps used in the manufacture of the magnetic head of the present invention.

The magnetic head 40 is produced using known thin layer and thin film techniques, respectively. As shown in FIG. 5, the starting material is an initially planar non-magnetic substrate 41a which can consist of a TiC-$Al_2O_3$ mixed ceramic material. As can be seen in the cross section shown in the FIG. 5, an initially planar flat side 62 of substrate 41a, for example, trench-like depression 63, is created. This depression, as shown, has an approximately rectangular shape of predetermined extent a and predetermined depth t. The dimensions of these values are given by the shape of the magnet leg forming the auxiliary pole to be produced. Frequently, however, the depressions have slopes or rounded walls of the depression that facilitate the production of the layers to be placed in the depression. This improves the guiding of the magnetic flux. Coupling the two magnet legs in the common connection region is thus facilitated. The entire extent a of the depression in the longitudinal direction should lie between 60 and 300 μm. The longitudinal direction is defined as the direction of main expanse of the magnetic head being produced and its magnet legs. The floor 65 adjoins a side face 64 and lies in the depression 63 parallel to the plane of the flat side 62. The floor can be smoothed using, for example, chemical or mechanical polishing. Alternately, a smooth coating, for example a glaze, can be provided. The depth t of the floor 65 is best selected to be between 7 and 200 μm with respect to the plane of the flat side 62. Additionally, a thin insulating layer, not shown, can be deposited on the substrate 41a if it consists of an electrically conducting material.

On the structure thus obtained, a hard, electrically conducting intermediate layer 67 such as NiP is subsequently applied. One of the functions of layer 67 is as an electrode for subsequent galvanic deposition of a magnetic layer 68 that produces the magnet leg forming the auxiliary pole of the magnetic head according to the present invention. The magnetic layer 68 has a comparatively great thickness d2. The region of the floor layer 65 consists of amorphous CoZr, containing potentially ternary admixtures, or of a NiFe alloy like PERMALLOY. The magnetic layer is between 2 and 30 μm thick and preferentially laminated by thin, non-conducting layers to minimize the eddy-current losses that occur at higher frequencies. The thickness of the discrete lamina depends on the intended frequency range. Generating the insulating layers between the lamina can be carried out particularly simply through the oxidation of the particular magnetic layer. In addition, the separating insulating layers also can be produced with known chemical or physical vapor deposition such as CVD or PVD techniques. A thin galvanic electrode is applied on each oxide layer through currentless deposition or using CVD or PVD techniques. A further magnetic layer is galvanically deposited. These layers are sequentially placed on each other until the desired thickness d2 of the magnetic layer 68 is reached. Lastly, this entire structure is covered and coated, respectively, with a very thick, hard insulating layer 70 corresponding to the material of the gap layer. Examples of materials that are suitable for this purpose are $Al_2O_3$ and glass.

FIG. 5 shows the structure obtained after this processing step. The structure is subsequently finished by lapping or polishing from the side of the insulating layer 70 to the plane 71 determined by the intermediate layer 67 of NiP. Intermediate layer 67 simultaneously serves as a polishing stop for this process.

Figure 6:
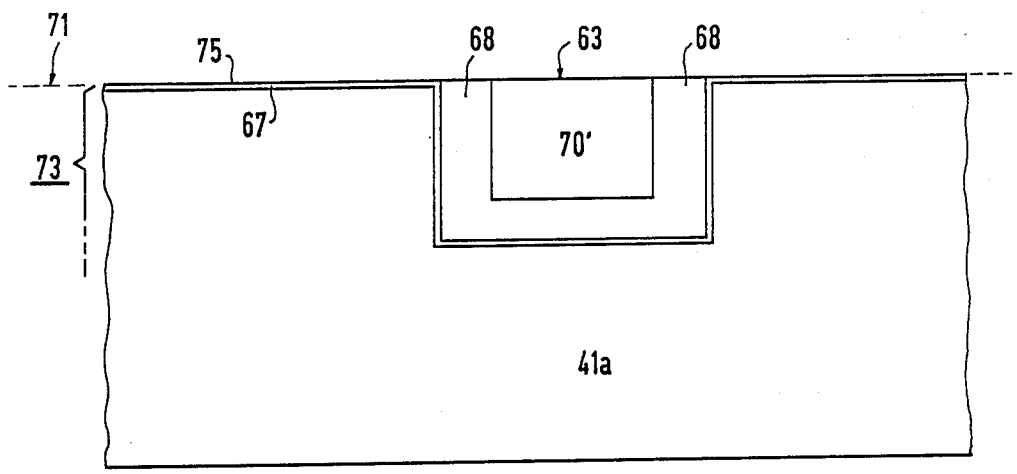

The corresponding intermediate product 73 is shown in FIG. 6. It has an entirely planar surface 75. Magnetic layer 68 is exposed in the region of the depression 63. The residue of the insulating layer 70 remains in the depression 63 and is designated as 70'.

Figure 7:
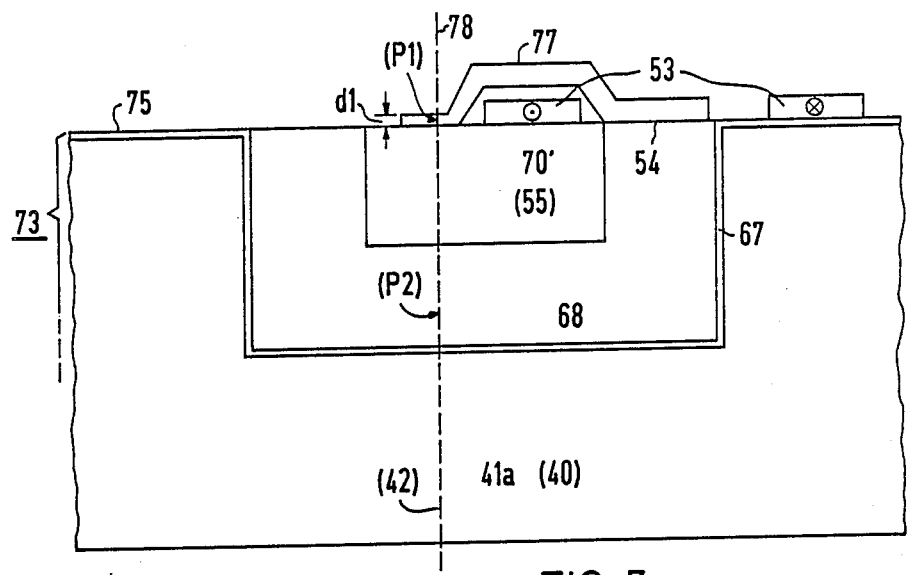

FIG. 7 shows how the intermediate product 73 has a leveled surface for receiving the windings of a read/write wire-wound coil 53 and a magnetic layer 77. Magnetic flux returns between the magnetic layers 68 and 77 in the connection region 54. The main pole of the magnetic head has a thickness d1. The main pole is formed with the magnetic layer 77 consisting of, for example, the same material as the magnetic layer 68. The structure shown in FIG. 7 is separated by, for example, sawing or cutting along a plane 78 perpendicular to the surface 75 as indicated by the dashed line. The position of this plane is chosen so that the flying body carries the underside of the magnetic head with it. The cut face of plane 78 is subsequently lapped.

Figure 8:
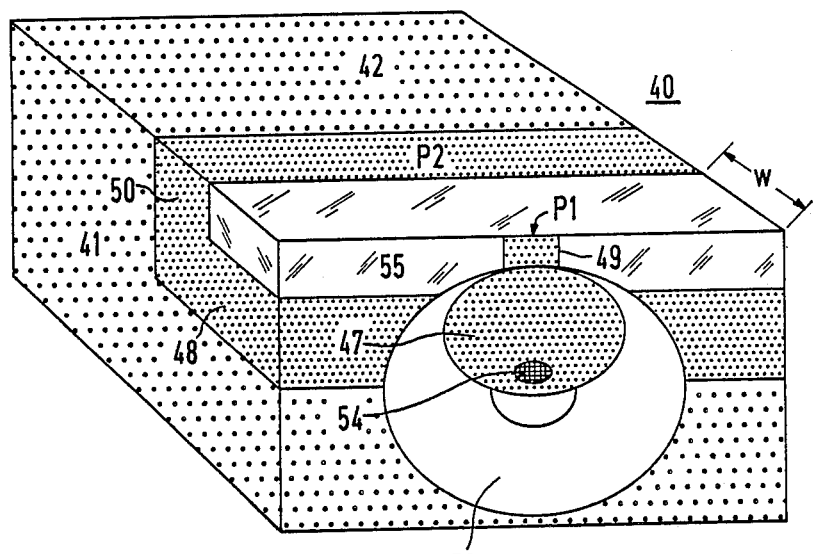

The magnetic head 40 shown in cross section in FIG. 4 is also shown in an oblique view in FIG. 8. The space of depression 63 that remains after the separation process corresponds to the recess 60 while the remaining part of the residual insulating layer 70' corresponds to the gap layer 55. The remaining part of the original substrate 51a is now the substrate 41 that carries magnetic head 40.

The foregoing disclosure presumes that only one magnetic head was to be built. A series of magnetic heads could easily be produced that are aligned next to each other. The particular depression for these heads can be combined into one trench-like groove. The foregoing discussion has also omitted, for the sake of clarity, any representation of common customary auxiliary layers that are used, for instance, for insulation or planning.

What is claimed is:

1. A laminated magnetic head for perpendicularly or vertically magnetizing a recording medium, comprising:
   a non-magnetic substrate;
   a magnetic conductor body for carrying magnetic flux, said conductor body having first and second magnetic legs disposed on one side of said substrate;
   a thin main pole formed on said magnetic conductor body at a first end piece thereof, said first end piece including said first magnetic leg;
   an auxiliary pole formed on said magnetic conductor body at a second end piece thereof, said second end piece including said second magnetic leg, said first and second end pieces being aligned behind each other along a direction of travel of said head;
   an insulating gap layer positioned between said first and second end pieces and extending at least 5 μm between said end pieces;
   a read/write coil winding coil having conductor windings extending between said legs; and
   a recess in said substrate into which at least said second end piece of said second magnetic leg forming said auxiliary pole, at least one further part of said second leg and at least a part of said gap layer are received.

2. A magnetic head as claimed in claim 1, wherein said recess completely receives said second magnet leg, said second end piece and said gap layer.

3. A magnetic head as claimed in claim 1, wherein said gap layer is formed from glass or $Al_2O_3$.

4. A magnetic head as claimed in claim 1, wherein said substrate comprises a $TiC-AL_2O_3$ mixed ceramic material.

5. A magnetic head as claimed in claim 1, wherein said auxiliary pole has an area facing the recording medium that is greater in magnitude by at least two orders of magnitude than a corresponding area of said main pole.

6. A magnetic head as claimed in claim 1, wherein said auxiliary pole has a thickness, measured in the direction of travel of the magnetic head, which is greater than a permissible flux change distance that is determined with respect to a recording code on the recording medium.

7. A magnetic head as claimed in claim 1, wherein said auxiliary pole has a thickness, measured in the direction of travel of the magnetic head, between 2 and 30 μm.

8. A magnetic head as claimed in claim 1, wherein said auxiliary pole has a thickness, measured in the direction of travel of the magnetic head, that is at least three times greater than a corresponding thickness of said main pole.

9. A magnetic head as claimed in claim 8, wherein said auxiliary pole has a thickness, measured in the direction of travel of the magnetic head, at least five times greater than a corresponding thickness of said main pole.

10. A magnetic head as claimed in claim 1, wherein said first and second magnet legs comprise discrete lamina to form laminated magnetic layers.

11. A magnetic head as claimed in claim 10, further comprising a thin, electrically nonconducting layer between each of said discrete lamina of said laminated magnetic layers.

* * * * *